UNITED STATES PATENT OFFICE.

GEORGE W. HOLLEY, OF NIAGARA, NEW YORK.

PRESERVING IRON FROM CORROSION.

Specification forming part of Letters Patent No. 40,752, dated December 1, 1863.

*To all whom it may concern:*

Be it known that I, GEORGE W. HOLLEY, of the town and county of Niagara, and State of New York, have discovered a new and Improved Process to Protect the Surface of Wrought-Iron from Corrosion; and I do hereby declare that the following is a full and correct description thereof.

One method of securing the object of my discovery is as follows: First, make the surface of the iron to be coated perfectly clean. Then take of any one of the porcelain "frits," so called, sixty pounds, and add thereto not less than ten (10) pounds of finely calcined and pulverized feldspar, and not less than twenty (20) nor more than forty (40) pounds of dry white lead. Mix them together and add sufficient water to make a mixture of the consistency of ordinary cream. Then put the whole into a common porcelain or frit mill and grind until a thorough incorporation of the ingredients is produced. Next take not less than ten (10) nor more than fifteen (15) parts of this mixture by weight, and add to it not less than one nor more than ten parts, by weight, of any of the fat "alum" or "potash" clays, so called, first having calcined and pulverized the clay and added sufficient water to make it of the same consistency as the frit, feldspar, and white lead. Then add sufficient water to the whole compound to reduce its consistency to such a degree as will just permit it to adhere to and cover the whole surface of the iron to be coated, either when the iron is dipped into the compound or when the latter is poured onto the iron, and in either case it must be allowed to drain off until it leaves only a thin covering on the iron. After this composition is thoroughly dried the iron is placed in a common reverberatory furnace or oven and baked until the surface presents a glossy or glazed appearance, when the iron is removed from the oven and allowed to cool gradually—the more slowly the better. It will then be found covered with a vitreous coating, which is hard, glassy, strongly adhesive, flexible, and tough enough to resist any bending of the iron less than at a right angle, and indestructible by any of the ordinary acids or alkalies, apparently owing its flexibility and adhesiveness to the fact that the compound is caused to yield, by the baking process, metallic aluminium, which lies between the iron and the outer glaze, firmly adhering to both, or is uniformly disseminated through the compound.

To produce a metallic surface on iron, so as to protect it from oxidation, I proceed as follows: Take from two to three pints, by weight or measure, of any of the fat alum or potash clays prepared by calcination and pulverization, and add threto from one to two parts pure boracic acid. Mix thoroughly in water and run through a paint-mill, leaving the mixture when it comes from the mill of about the consistency of thick cream. Dip the iron into the paste and allow the latter to dry perfectly. Then bake, as before directed, until the paste is "reduced," as it is termed, by the heat, which will be indicated by its glassy and pitted appearance. Then remove the iron from the oven, care being taken not to allow anything to come in contact with the paste, since in its soft state it would be removed from the iron. As the iron shrinks by cooling the slag will be removed by decrepitation, leaving the iron covered with a metallic surface. In obtaining the flexible glaze by means of a porcelain frit, instead of using alum or potash clay in any proportion, very finely-pulverized glass may be used instead in the proportion of one to two parts of the glass to two to five parts of the frit.

In obtaining the metallic surface, instead of three parts of alum or potash clay and one to two parts of boracic acid, there may be used one part of alum or potash clay with one to three parts of chloride of aluminium and one-half part to one part of boracic acid; or there may be used five parts of the double fluoride of aluminium and sodium (cryolite) and five parts of chloride of potassium, two parts of sodium, and one to two parts of alum or potash clay. This is then to be covered with three coats of coal-oil or kerosene, which will increase its resistance to corrosion, and, by its offensiveness, repel the attacks of certain animalculæ or mollusks.

What I claim, and desire to secure by Letters Patent, is—

Protecting the surface of iron from corrosion by means of a glaze or coating, the compositions for said glaze or coating being formed and applied substantially as herein set forth and described.

GEORGE W. HOLLEY.

Witnesses:
   M. M. LIVINGSTON,
   HENRY T. BROWN.